July 6, 1965 C. M. SCHOTT, JR 3,193,547
METHOD AND APPARATUS FOR EXTRUDING PLASTIC
Filed Sept. 7, 1961 3 Sheets-Sheet 1

July 6, 1965

C. M. SCHOTT, JR 3,193,547

METHOD AND APPARATUS FOR EXTRUDING PLASTIC

Filed Sept. 7, 1961

United States Patent Office 3,193,547
Patented July 6, 1965

3,193,547
METHOD AND APPARATUS FOR EXTRUDING
PLASTIC
Charles M. Schott, Jr., Gloucester, Mass., assignor to
Gloucester Engineering Co., Inc., Gloucester, Mass., a
corporation of Massachusetts
Filed Sept. 7, 1961, Ser. No. 136,495
11 Claims. (Cl. 264—209)

This invention relates to apparatus and method for producing plastic film and sheeting by extruding through an annular die orifice. Such film and sheeting is valued in proportion to its gloss, clarity, strength and uniformity of appearance and thickness, and one objective of this invention is to produce film and sheeting better in these respects than that now available.

Present commercial tube extrusion dies have one or more internal obstructions in the plastic flow path caused by connecting structure between inner and outer die portions. Each obstruction tends to create an undesirable fusion line in finished film and sheeting. Probably even more objectionable is the fact that certain materials such as polyvinyl chloride cannot be extruded with these dies on an economical and continuous production basis. This is because any obstructions in the die will cause hang-up or slow moving of portions of material, and these slow moving portions will age and even decompose because they remain in the heated die for too long a period. As these aged or decomposed portions bleed out and mix with the normal material, they cause finished film and sheeting to have severely discolored areas or streaks. In addition, aged or decomposed portions cause undesirable strength variations in film and sheeting. These effects make the product much less valuable and sometimes completely useless. Although some of the presently difficult materials to extrude can be run for limited periods of production eventually the die becomes too contaminated with aged or decomposed material and the whole line must be shut down so that the die can be completely disassembled and cleaned. This is a very costly and time consuming process.

One particular objective of the present invention is to avoid these problems.

After plastic leaves the extrusion die, stretching or orientation of the plastic is desired for most film and sheeting applications. Many applications require orientation in two directions, or "biaxial orientation" as it is termed in the industry. This strengthens film and sheeting, and permits a much smaller die to be used for a given width. With tubular extrusions transverse orientation occurs as the tube is enlarged by forces applied from within the tube and longitudinal orientation is accomplished by pulling off the tube at a faster speed than the extrusion speed. In addition the plastic must be cooled to stabilize the oriented form and permit subsequent handling. In general, the quicker plastics such as the polyolefins are cooled, the clearer they will be.

It has long been recognized that quick cooling by quenching of film by direct contact with a mass of water or similar liquid is advantageous in producing a clear product, and this has been used in flat die extrusion processes in which orientation is limited to the longitudinal or machine direction. But liquid quenching has not been employed in the extrusion and biaxial stretching of tubes and such film has ordinarily been stabilized by slower acting cool air, water spray or cooled former, with consequent cloudiness of the film.

Another objective of the invention is to provide for direct contact liquid cooling for stabilizing biaxially oriented tubularly extruded films, and thereby to provide a clearer and glossier biaxially oriented film than heretofore obtainable with tubular extrusions.

Other objectives of the invention include providing a method and apparatus for tubular extruding of film which is simpler to construct and operate than those heretofore known; forming a film with lower extruding pressure requirements; ensuring constant film thickness throughout the film area; providing for simple adjustment of the die orifice gap and providing a die assembly which is simple to fabricate and maintain.

In the drawings:

FIG. 1a is a magnified, diagrammatic view illustrating the means by which the cooling and stretching is achieved by the embodiment of FIG. 1.

Figure 1:
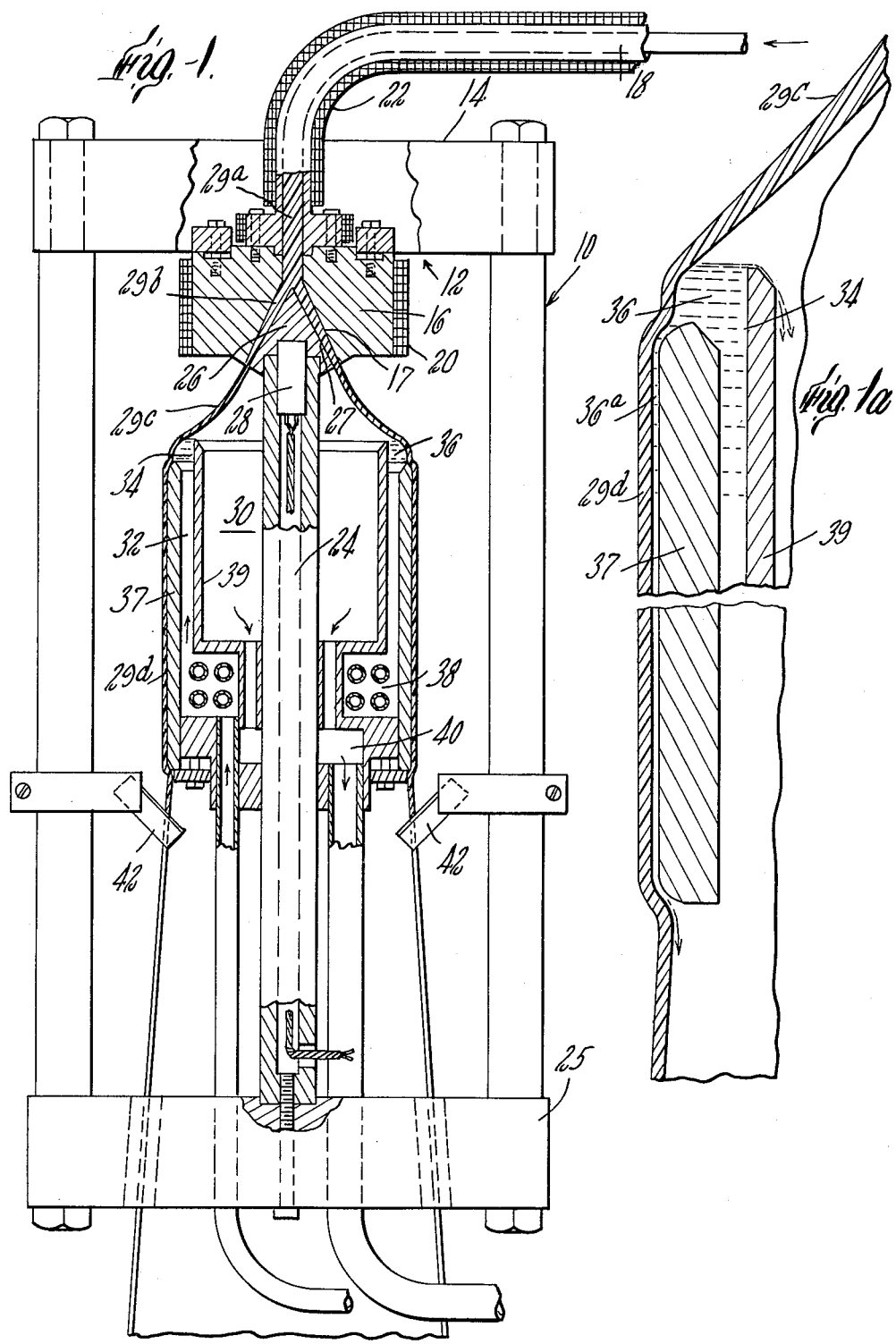
FIG. 1 is a vertical cross-section of one preferred form of the apparatus of the invention, with the thickness of the film shown exaggerated.

Referring to FIG. 1 there is a die support structure 10 to be mounted to a base such as a pedestal or floor (not shown).

A die ring assembly 12 is mounted on upper support bracket 14. This assembly includes a die ring 16 defining a hollow outer die surface 17, a plastic supply conduit 18 for connection to a supply of pressurized plastic such as comes from an extruder apparatus, a die ring heater 20 and supply heater 22.

A die arbor assembly is mounted below, which includes an elongated arbor 24, mounted on arbor support 25, and a die plug 26 mounted on the upper end of the arbor. The die plug is in the form of a cone which extends into, but has no direct attachment to the die ring 16. The plug surface 27 cooperates with the ring surface 17 to define an annular orifice in direct fluid flow relation to an axially aligned portion of the plastic supply conduit. A plug heater 28 is provided in heat transfer relation to the plug. As shown plastic 29a flowing in the conduit flows into an annular form 29b as it encounters the die plug 26 and emerges from the orifice as an expanding cone 29c ready to be quenched at its maximum diameter.

One important advantage of this apparatus is that there are no die obstructions to cause fusion lines or "hang up." For the same reason less power is required for extruding than required heretofore.

As noted above, the arbor is elongated. It is advantageously made laterally flexible. The plastic when forced against the die plug 26 exerts pressure thereon, a component of which acts in the lateral direction, inwardly of the plug. Forces on oppositely directed sides of the plug act in opposition. Whenever the plug is off center, the passage for plastic is narrowed at one side and widened on the opposite, thereby increasing the pressure exerted by the material which tends to flow through the first and lessening the pressure at the second. This forces the plug, and the arbor connected thereto towards the center. Thus the device is self-centering by the action of the plastic. The annular orifice is thereby maintained at a constant dimension throughout its circumference and the liquid mandrel is maintained in alignment. Present dies require time consuming orifice gap adjustment by skilled mechanics, therefore the ultimate uniformity of the finished film or sheeting depends, to a large part, on the skill of the mechanics involved. The present die has no such critical adjustments. A still further advantage is the adjustable orifice gap that is achieved by the conical shape of the die parts and a simple vertical adjustment means.

Spaced below the die orifice is a liquid mandrel assembly 30 mounted on the arbor. This comprises a liquid distributing passage 32 for conducting quenching-lubricating liquid in the direction of the die, an annularly shaped liquid bath cavity 34 adjacent the die, filled with liquid 36 over which the cone 29c is drawn, the liquid quenching the film and applying an outward force causing distension, and a mandrel cylinder 37 over which liquid flows from the bath, this liquid floating the film so that no direct contact occurs between the plastic film and the cylinder.

A liquid temperature regulator 38 is provided in the liquid supply piping, which can take the form of heat exchange coils for heating or cooling. This can be situated outside of the assembly, but for simplicity of construction is mounted on the arbor as shown.

A liquid outlet 40 is provided within the mandrel cylinder for receiving and conducting away liquid forced inwardly from the bath cavity 34, into inner cylinder 39.

Slitter blades 42 are provided at a point spaced below the bath, for slitting the tube into sheets of film. From these the film can be tensioned, led away and rolled.

The mandrel cylinder has a substantial length not for the purpose of cooling but for defining a section of stabilized film for absorbing tension differential stress imposed by the take-up means so that the extruding and orienting section of the film 29c is not subjected to any shear stress. The circular vertical passage 32 has a substantial length which smooths out turbulence in the incoming liquid and provides a uniform annular flow, and uniform overflow resulting in the required smooth bath surface. As shown this passage can be defined in part by the mandrel cylinder 37, and in part by inner cylinder 39.

Referring to FIG. 1a it will be seen that forces are applied to the inside of the tube by liquid 36 held in the bath cavity 34, and liquid 36a moves with the film 29d whereby the film is prevented from engaging the cylinder 37. The film is quenched and stabilized before it reaches the cylinder.

Figure 2:
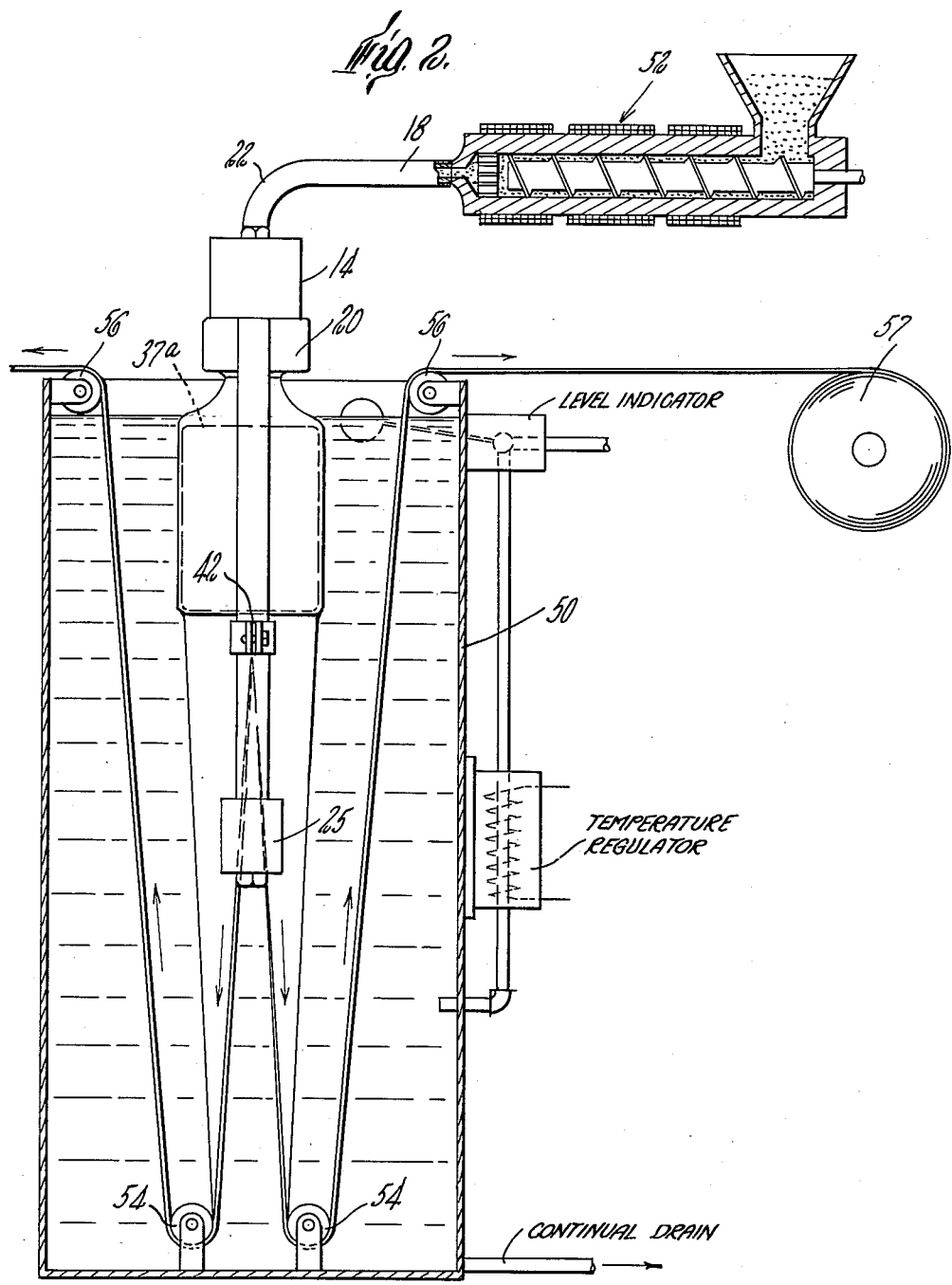
FIG. 2 is a vertical cross-section on a smaller scale of another preferred form of the invention.

Referring to FIG. 2, this embodiment provides for immersion-quenching on both inner and outer surfaces of the tube, and for this purpose a tank 50 is filled with liquid, a portion of which enters the tube. The mandrel cylinder 37a is hollow, hence its interior is in communication with liquid in the tank. Where movement of the film downwards does not maintain sufficient circulation to enable continuous cooling from within, a circulating means such as a small pump can be employed to ensure the dynamic cooling liquid flow condition. As in the foregoing embodiment liquid within the tube is maintained in contact therewith above the top of the mandrel cylinder so that distending forces are applied to the tube by the liquid and contact between plastic film and cylinder is avoided. In this embodiment an extruder 52 is shown, adapted to be fed pellets of polyethylene and the like.

The slitter blades 42 divide the tube into two sheets. These are trained over rollers 54 and 56, and pass from the tank to take-up roll 57 where tension is applied for longitudinal stretching.

Figure 3:
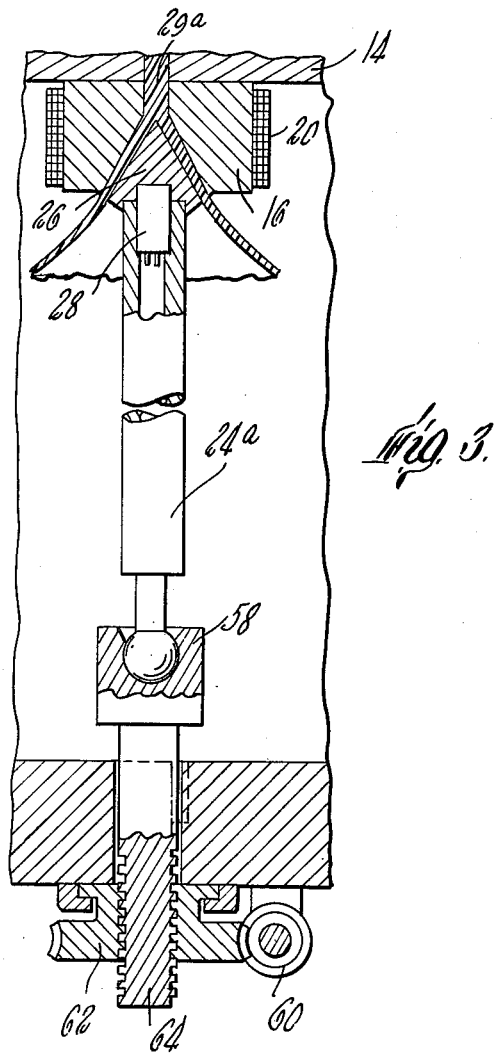
FIG. 3 is a sectional view of a preferred embodiment which achieves accurate adjustment of the orifice gap.

Referring to FIG. 3 the arbor 24a is pivoted in ball joint 58 so that the plug 26 is freely movable in all lateral directions, permitting self-adjustment of the orifice to ensure constant film thickness. Additionally an adjustment means in the vertical direction between die ring 16 and plug 26 is provided whereby the dimensions of the orifice can be varied. As shown this adjustment means comprises a worm 60, a driven nut 62 and threading on the arbor 64. The arbor is keyed to slide up and down without turning.

Figure 4:
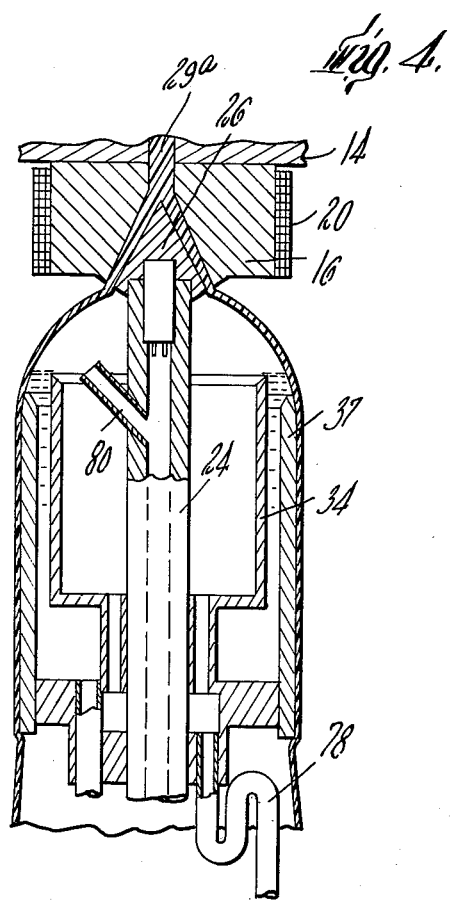
FIG. 4 is a preferred embodiment employing air pressure for distension of the tube immediately as it emerges from the orifice.

Referring to FIG. 4, this embodiment is similar to FIG. 1 except that an "S" trap 78 is provided in the drain to positively block passing of air, and air pressure is introduced through passage 80 connected through the arbor to a compressed air supply and cooperates with the liquid to distend the film. Nothing solid but only fluids directly apply the forces here as in the preceding embodiments; and as in those embodiments a dynamic action of the circulating temperature regulated liquid inside the tube ensures quenching from within.

The advantage of partially expanding the tube with a gas is that the tube will assume a more cylindrical shape as it approaches the quenching bath and consequently will enter the quenching bath at a more perpendicular angle. This creates less disturbance of the required smooth surface of the bath. An unsteady bath surface will cause gage variation in the film or sheeting.

When using a gaseous medium to expand the extruded tube, as here, means for positively preventing the escape of said gaseous medium out of the water drain is required and that is the purpose of the simple S tube that serves as a gas trap like that used in a waste drain. If more positive drainage is needed, then a positive displacement pump could be used. The gas pressure can be controlled by a very sensitive pressure regulated flow control valve.

Liquid quenching on both sides of the tube can be employed with air distension. When the pressure necessary to sufficiently expand the extruded tube will cause a substantial difference between inside and outside liquid levels, then an inside liquid supply and drainage apparatus separate from the tank can be employed so that inside and outside liquid pressures are separate with each having a separate level control, and separate temperature regulation means as well.

Certain modifications can be employed within the spirit and scope of the invention.

What is claimed is:

1. The method of producing clear, molecular oriented plastic film by extruding plastic tube in the heated state through an annular die and cooling it and stretching it widthwise, the improvement comprising contacting the inside surface of the heated plastic after it emerges from said die, in close proximity thereto and before it reaches its final, enlarged width with an axially disposed circular mass of cooling liquid, and immediately thereafter applying outward stretching forces by means of a rigid surfaced mandrel member located within said plastic tube, the liquid serving to lubricate the plastic film as it stretches and moves over said mandrel member.

2. In a machine for producing film from a thermoplastic material comprising inner and outer die means defining an annular die orifice adapted for connection to the output of an extruder apparatus which can force heated plastic under pressure through said orifice to form a plastic tube, means for orienting said plastic tube after it issues from said orifice by stretching said tube widthwise, and a slitter for slitting said tube after it has been oriented, said means for orienting said tube including a mandrel member defining a rigid outer surface having a peripheral dimension greater than that of said die orifice, said surface axially aligned with said orifice on the side toward which said plastic tube progresses, said mandrel member positioned so that plastic tube issuing in the heated state from said orifice can expand in diameter as it moves from said orifice toward said mandrel surface and then can move generally axially over said mandrel surface before reaching said slitter, the improvement wherein said mandrel member and said inner die means which defines the inner side of said annular orifice are mounted on arbor means, said arbor means for said inner die means being elongated and extending from said inner die means in the direction of travel of said plastic tube, across the spacing over which the plastic tube expands in diameter to said mandrel member, said arbor means for both said mandrel member and said inner die means supported by stationary means located downstream from said outer die means beyond said slitter.

3. The machine of claim 2 wherein said arbor means for said inner die means mounts said die means with freedom to move radially with respect to the outer die means, said inner die means having a conical leading part adapted to relatively pierce the plastic stream being forced theretowards by said extruder, whereby the pressure of plastic flowing past said inner die means, exerted on said conical leading part can center said inner die means relative to said outer die means.

4. The machine of claim 3 wherein said inner die means and said rigid surfaced mandrel member are connected together in axial alignment whereby the axial alignment of said inner die means with said outer die means also axially aligns said mandrel member with said annular orifice.

5. The machine of claim 2 wherein said elongated arbor means for said inner die means comprises an elongated shaft extending from said inner die means to a stationary mounting located beyond said slitter, and said mandrel member is mounted upon said shaft.

6. The machine of claim 2 adapted to produce plastic film of improved clarity, said die orifice disposed so that said hot plastic tube moves vertically downward from said orifice, wherein a means is provided for locating a circular mass of cooling liquid within and exposed directly to said tube in the region of the upper part of said rigid surfaced mandrel member, said mandrel surface being in the form of a surface of revolution, said liquid extending upwardly to a liquid level adjacent to but spaced below said orifice, at a location to enable the liquid to contact the inside of said tube before said tube expands to the diameter of said mandrel member, whereby said tube can be expanded while hot as it moves down from said die to said liquid level, can be then immediately cooled while receiving outward support from said liquid, and can then be stretched widthwise by outward forces applied by said mandrel member.

7. In a machine for producing film from a thermoplastic material comprising inner and outer die means defining an annular die orifice adapted for connection to the output of an extruder apparatus which can force heated plastic under pressure through said orifice to form a plastic tube, means for orienting said plastic tube after it issues from said orifice by stretching said tube widthwise, and a slitter for slitting said tube after it has been oriented, said means for orienting said tube including a member defining an outer surface having a peripheral dimension greater than that of said die orifice, said surface axially aligned with said orifice on the side toward which said plastic tube progresses, said member positioned so that plastic tube issuing in the heated state from said orifice can expand in diameter as it moves from said orifice toward said surface and then can move generally axially over said surface before reaching said slitter, said member supported by stationary means located beyond said slitter in the direction of travel of said plastic, said die orifice disposed so that said hot plastic moves vertically downward from said orifice, the improvement wherein said member comprises a rigid-surfaced mandrel member located to apply widthwise stretching forces to said tube, the surface of said mandrel being of the form of a rigid substantially straight sided surface of revolution, said surface of revolution having a substantial axial extent, and a means is provided for locating a mass of cooling liquid within and exposed directly to said tube in advance of the point where the plastic tube reaches said surface of revolution whereby said plastic tube can be simultaneously cooled and lubricated for passage over the outside surface of said rigid mandrel.

8. In a machine for producing film from a thermoplastic material comprising inner and outer die means defining an annular orifice adapted for connection to the output of an extruder apparatus which can force heated plastic under pressure through said orifice to form a plastic tube, the improvement wherein the inner die means is mounted on the forward end of an elongated shaft means, said shaft means being rigid in the direction of movement of the plastic, means restraining the axial movement of said shaft means, at least the forward end of the said shaft means being free to move laterally, the inner die means thereupon supported being laterally movable within the outer die means, said inner die means having a conical leading part adapted to relatively pierce the plastic stream being forced theretowards by said extruder, whereby the pressure of plastic flowing past said inner die means can exert lateral pushing forces on said inner die means tending to center it relative to said outer die means.

9. The machine of claim 8 wherein said means restraining the axial movement of said shaft means comprises a ball joint means, the movable member of said ball joint means secured to said shaft means.

10. The machine of claim 8 wherein said shaft means supports means defining a rigid outer mandrel surface adapted to engage the inside surface of said plastic tube for establishing the form thereof.

11. The machine of claim 8 wherein said shaft means is supported at an end located downstream and remote from the orifice, upon a stationary support means.

References Cited by the Examiner

UNITED STATES PATENTS

| | | | |
|---|---|---|---|
| 1,769,730 | 7/30 | Wetmore. | |
| 1,845,249 | 2/32 | Derby | 18—14 XR |
| 2,433,937 | 1/48 | Tornberg | 18—48 |
| 2,514,841 | 7/50 | Chase | 18—14 |
| 2,562,135 | 7/51 | Strobel | 18—14 |
| 2,708,772 | 5/55 | Moncrieff | 18—14 |
| 2,720,680 | 10/55 | Gerow | 18—14 |
| 2,863,172 | 12/58 | Buteux et al. | 18—14 |
| 2,887,721 | 5/59 | Blanchi et al. | 18—14 |
| 2,987,765 | 6/61 | Cichelli | 18—14 |
| 3,008,186 | 11/61 | Voigt | 18—14 |
| 3,012,276 | 12/61 | Given | 18—14 |
| 3,090,991 | 5/63 | Hathaway | 264—290 |
| 3,090,998 | 5/63 | Heisterkamp et al. | 264—95 |
| 3,108,324 | 10/63 | Zavasnik | 264—210 |
| 3,111,714 | 11/63 | Branscum | 18—14 |

FOREIGN PATENTS

| | | |
|---|---|---|
| 1,055,031 | 5/55 | France. (Addition to No. 63,912) |
| 1,237,734 | 6/60 | France. |
| 853,745 | 11/60 | Great Britain. |

ALEXANDER H. BRODMERKEL, *Primary Examiner.*

WILLIAM J. STEPHENSON, *Examiner.*